United States Patent [19]

Blasbalg

[11] 4,356,793
[45] * Nov. 2, 1982

[54] BIRD FEEDER

[76] Inventor: Morton L. Blasbalg, 26 Sandro Dr., Warwick, R.I. 02886

[*] Notice: The portion of the term of this patent subsequent to Aug. 2, 1996, has been disclaimed.

[21] Appl. No.: 852,082

[22] Filed: Nov. 16, 1977

[51] Int. Cl.³ .............................................. A01K 39/01
[52] U.S. Cl. .................................................. 119/51 R
[58] Field of Search ........................... 119/51 R, 52 R

[56] References Cited

U.S. PATENT DOCUMENTS

| | | | |
|---|---|---|---|
| 2,306,312 | 12/1942 | Hyde | 119/51 R |
| 2,591,459 | 4/1952 | Meany | 119/52 R |
| 3,568,641 | 3/1971 | Kilham | 119/51 R |

Primary Examiner—Hugh R. Chamblee
Attorney, Agent, or Firm—Robert J. Doherty

[57] ABSTRACT

A wild bird feeder comprising an elongated hollow cylindrical body of a clear transparent plastic material. The bottom is provided with an integral closure and the top is provided with a removable closure cap for filling with bird seed. The body is provided with a plurality of feeding stations, each comprising an opening through the cylinder wall with an aligned diametrically opposite opening to form a pair of feeding stations on opposite sides of the cylinder. Below the upper pair of openings is another pair circumferentially staggered from the upper pair by approximately 60°. Below these is a third set of openings again staggered 60°. To prevent the seed from falling out, eachopening is provided with a baffle member having an integral collar which surrounds the outside of the opening. The baffle member is rounded at the top and open at the bottom and extends into the cylinder toward the opposite opening baffle. One of the opposed baffles has a central axial opening and the other baffle has a tubular axial extended portion adapted to enter the axial opening. When the baffles are pushed into place, a swaging tool is used to upset the inner end of the tubular extension to lock the opposed baffles to each other. Spaced below each set of baffles is a wooden rod passed through openings in the cylinder wall and protruding on each side under the baffle openings to form perches for the birds. An elongated wire is provided with a loop at its upper end and passes through an opening in the top. At the bottom end the wire is looped around the upper wooden perch rod to provide a support for hanging the feeder.

4 Claims, 6 Drawing Figures

U.S. Patent  Nov. 2, 1982  4,356,793
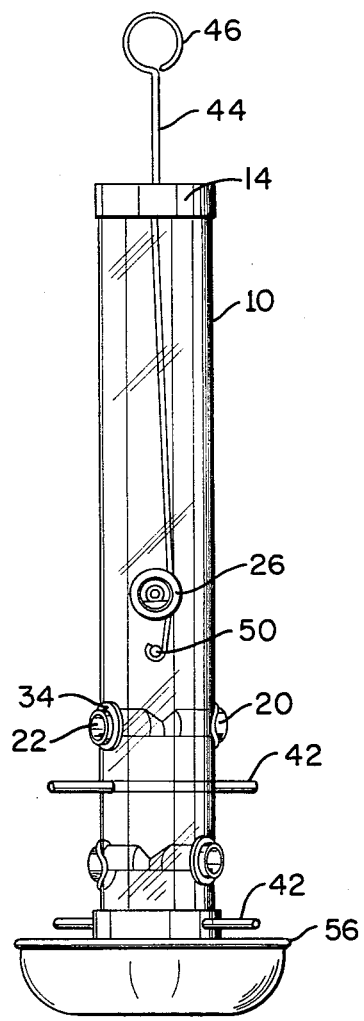
FIG. 1
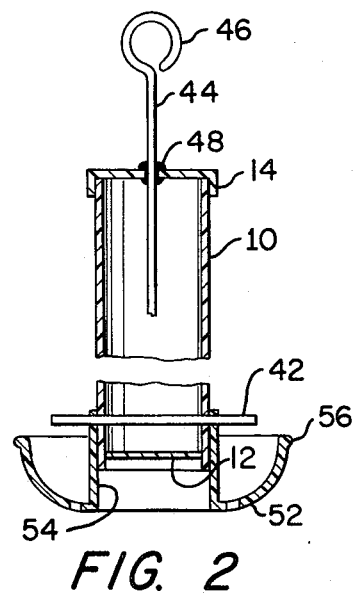
FIG. 2
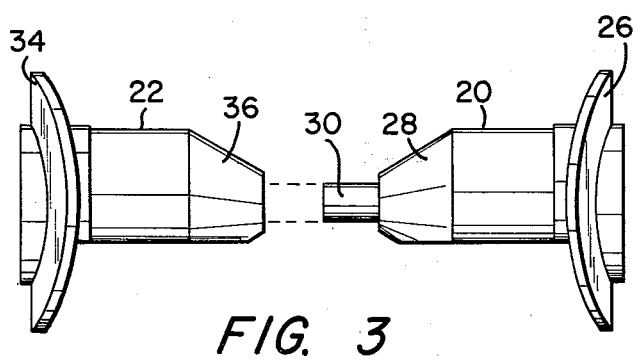
FIG. 3
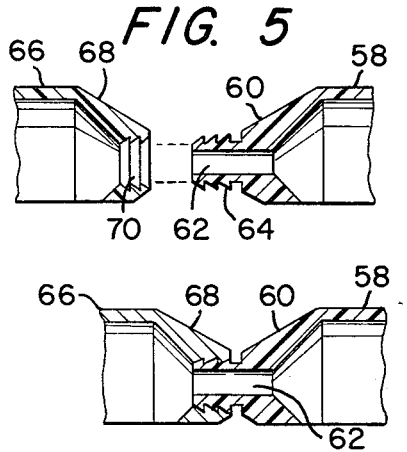
FIG. 5
FIG. 6
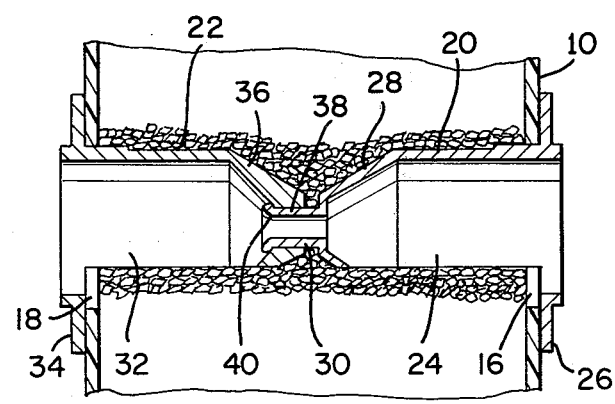
FIG. 4

BIRD FEEDER

BACKGROUND OF THE INVENTION

Bird feeders have presented problems in filling and in keeping squirrels and other animals away from the feed. Also, when the bird eats some seeds, the balance of the seeds are often out of reach. An attempt has been made to correct this by the construction shown in U.S. Pat. No. 3,568,641. However, the feeder shown therein is expensive to manufacture and assemble. The various parts must be slowly hand assembled, making for an expensive item.

SUMMARY OF THE INVENTION

The present invention provides a wild bird feeder which is simple in construction and easy to assemble. An elongated hollow cylinder is made of a clear plastic material so that the bird seed can be viewed. The bottom is closed and the top is provied with a removable cover. The body is provided with a plurality of feeding stations in pairs on opposite sides of the cylinder. Each feeding station comprises an opening into which a baffle member is inserted. Each baffle member comprises an integral collar adapted to surround the outside of the opening and a baffle portion comprising a barrel-shaped member open at the bottom to leave a top arcuate surface. At each pair of opposed openings, one baffle member is provided with a central axial opening and the other is provided with a central axial tubular extension adapted to enter this opening. When the opposed baffles are inserted, the tubular extension enters the opening. A swaging tool is then inserted to upset the inner end of the tubular member to lock the baffles to each other. Spaced below each pair of openings is a wooden rod which is passed through openings in the cylinder and protrudes on each side to form a perch for the bird directly beneath the feeding opening.

DESCRIPTION OF THE DRAWINGS

In the drawings:

FIG. 1 is a side elevation of a wild bird feeder embodying my present invention;

FIG. 2 is a vertical section showing the addition of a seed catcher at the bottom end;

FIG. 3 is a side elevation of a pair of baffle members prior to assembly;

FIG. 4 is a section through the feeder and one of the pairs of baffle members after assembly;

FIG. 5 is a fragmentary section through an alternative plastic baffle construction; and FIG. 6 is a view similar to FIG. 5 with the members in assembled position.

DESCRIPTION OF THE INVENTION

Referring more in detail to the drawings, the wild bird feeder of the present invention comprises a hollow cylindrical body 10 of a suitable material. Preferably, the body 10 is of a transparent plastic material to allow the bird seed to be visible. The bottom of the cylinder 10 is closed at 12, the bottom being integral with the cylinder wall. At the top, the cylinder is provided with a closure cap 14 which is preferably a soft flexible plastic so that it can be tightened into position over the cylinder.

The cylinder 10 is provided with a plurality of feeding stations (6 shown). The feeding stations comprise openings 16 and 18 on opposite walls of the cylinder 10, a second pair of openings 16 and 18 below the first pair and circumferentially staggered therefrom by approximately 60°, and a third pair of openings 16 and 18 below the second pair and again staggered circumferentially another 60°.

Now referring to FIGS. 1, 3 and 4, I provide each opening with a baffle member, the openings 16 with baffle members 20 and the openings 18 with the baffle members 22. The baffle members 20 are generally arcuate members open at the bottom 24. Adjacent the outer end the baffle member 20 is provided with an integral collar 26 adapted to surround and protect the opening 16 when the baffle is inserted in the opening. The inner end of the baffle member 20 tapers forwardly at 28 to an integral axially extending tubular portion 30.

The baffle member 22 is complementary to the member 20 and is also provided with the lower opening 32 and collar 34. At the inner end, the baffle member 22 is tapered at 36 and terminates in a central axial opening 38 adapted to receive the tubular portion 30, FIG. 4, when the baffles are mounted in their respective openings. This construction allows for variations in the diameter of the cylinder. The portion 30 slides into the opening 38 and a swaging tool is then inserted to upset the end of the tubular portion at 40 to lock the baffles 20 and 22 to each other and to the cylinder 10.

Spaced below each pair of baffle members, the cylinder 10 is provided with an opening through which a wooden rod 42 is inserted. The rods 42 extend out of the cylinder body below each opening to form a perch for the birds. As can be seen in FIG. 4, when the cylinder is filled with bird seed, the seed will gravitate around the baffle members. The bird can insert his head into the baffle openings 24 and 32 to feed. As the bird feeds, the additional seed from above continually moves downwardly to replace the space and keep the feeding station full. Thus, with the cylinder 10 kept at a full level, the feeding stations will also maintain the proper feeding level by gravity.

To hang the bird feeder, I provide an elongated wire 44 having a loop 46 at the upper end. The wire 44 is passed through an opening 48 in the cover 14. It then extends past the upper set of baffle members 20 and 22, FIG. 1, and finally bent toward the center and hooked onto the perch rod 42 under the upper baffles at 50. Thus the feeder can be hung by the loop 46 and will maintain its upright position.

If desired, the feeder may be provided with a seed catcher for catching the seeds dropped by the birds and allowing for the consumption of these seeds. Referring to FIGS. 1 and 2, the seed catcher comprises a cup-shaped body 52 having a central axial vertical collar portion 54 of a diameter to snugly fit around the bottom of the cylinder 10. Adjacent the upper edge, the collar 54 is provided with diametrically opposed aligned openings. To mount the catcher on the feeder, the lowermost perch rod 42 is pulled out and the collar 54 is slipped over the bottom end until the openings in the collar align with the openings in the cylinder. The perch rod 42 is then reinserted, passing through the collar and the cylinder to lock the catcher to the cylinder at the bottom end. This construction allows the dropped seeds to fall into the catcher and the birds can perch on the catcher rim 56 to eat the dropped seeds.

The baffle members 20 and 22 are illustrated as made of metal, either molded or cast. However, these members can be made of a suitable durable plastic material in an easily assembled construction as shown in FIGS. 5 and 6. Referring to these figures, the outer ends of the baffles are identical with the baffles 20 and 22 and are therefore not shown. However, at the inner ends, the baffle 58 tapers at 60 toward a forwardly extending tubular portion 62 having detents or teeth 64 which extend rearwardly. The complementary baffle 66 is also tapered forwardly at 68 terminating in a central axial opening having ridges 70 on the inner wall with shoulders. Now, as shown in FIG. 6, when the baffles 58 and 66 are positioned in the cylinder and pushed toward each other, the detents 64 will enter the opening ridges 70 and interlock to lock the baffles to each other. This assembly is rapid and easy and requires no special tools or skill.

Other advantages of the present invention will be readily apparent to a person skilled in the art.

I claim:

1. A bird feeder comprising a cylindrical, hollow transparent plastic housing, said housing having an integral bottom and a removable top, said housing having a plurality of openings in vertically spaced and circumferentially staggered relation to each other, each of said openings having a complementary opening in aligned diametrically opposed relation, a baffle member extending into each of said openings, said baffle members having an open bottom to allow a bird to feed on the seed in said housing, a rod extending through said housing below each of said pairs of opposed openings, said rod extending outwardly from said housing to form a perch below each of said openings, and means on the inner ends of said baffle members in said opposed complementary openings for locking said baffles to each other, wherein said locking means comprises an integral axial tubular portion extending from the inner end of one baffle and an axial opening in to complementary baffle, said tubular portion extending into said opening, whereby the inner end of said tubular portion may be swaged to lock said complementary baffles to each other.

2. A bird feeder as in claim 1, wherein said baffle members are molded of a plastic material, said locking means comprising an integral axial tubular extension on one of said baffles, said extension having surface teeth, the other of said complementary baffle members having an axial opening with internal ridges, said teeth meshng with said ridges when said baffles are inserted into said openings to lock said baffle members to each other.

3. A bird feeder comprising a cylindrical, hollow transparent plastic housing, said housing having an integral bottom and a removable top, said housing having a plurality of openings in vertically spaced and circumferentially staggered relation to each other, each of said openings having a complementary opening in aligned diametrically opposed relation, a baffle member extending into each of said openings, said baffle members having an open bottom to allow a bird to feed on the seed in said housing, a rod extending through said housing below each of said pairs of opposed openings, said rod extending outwardly from said housing to form a perch below each of said openings, and means on the inner ends of said baffle members in said opposed complementary openings for locking said baffles to each other, and wherein each of said baffle members are generally cylindrical, the bottom portion of said cylindrical members being open, whereby said baffle members will prevent the seed from spilling through the opening, and wherein each of said baffles is provided with an integral collar adjacent the outer end, said collar surrounding the outside of said opening into which said baffle member extends, and wherein said locking means comprises an integral axial tubular portion extending from the inner end of one baffle and an axial opening in the complementary baffle, said tubular portion extending into said opening, whereby the inner end of said tubular portion may be swaged to lock said complementary baffles to each other.

4. A bird feeder as in claim 3, wherein said baffle members are molded of a plastic material, said locking means comprising an integral axial tubular extension on one of said baffles, said extension having surface teeth, the other of said complementary baffle members having an axial opening with internal ridges, said teeth meshing with said ridges when said baffles are inserted into said openings to lock said baffle members to each other.

* * * * *